(12) United States Patent
Schmider et al.

(10) Patent No.: US 6,456,024 B1
(45) Date of Patent: Sep. 24, 2002

(54) ELECTRONICALLY COMMUTATED DC MOTOR

(75) Inventors: Fritz Schmider, Hornberg; Stefan Lukenich, Singen, both of (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/722,181

(22) Filed: Nov. 27, 2000

(30) Foreign Application Priority Data

Nov. 27, 1999 (DE) .................................. 299 20 905 U

(51) Int. Cl.$^7$ ............................................... H02P 7/36
(52) U.S. Cl. ...................... 318/254; 318/439; 318/801; 363/17
(58) Field of Search .................. 318/138, 254, 318/439, 801; 363/17, 41, 132, 133; 310/63, 156.12; 417/423.7

(56) References Cited

U.S. PATENT DOCUMENTS

| | | | |
|---|---|---|---|
| 3,622,851 A | | 11/1971 | Hanada |
| 4,563,622 A | * | 1/1986 | Deavers et al. ............. 318/254 |
| 4,656,553 A | * | 4/1987 | Brown ....................... 318/254 |
| 5,075,606 A | * | 12/1991 | Lipman ..................... 318/254 |
| 5,176,509 A | | 1/1993 | Schmider |
| 5,859,519 A | * | 1/1999 | Archer ...................... 318/254 |
| 6,222,751 B1 | * | 4/2001 | Portaluri et al. ............ 318/439 |

FOREIGN PATENT DOCUMENTS

| | | |
|---|---|---|
| DE | 2 044 671 | 4/1971 |
| DE | 87-02271 | 6/1987 |
| DE | 27 18 428 C2 | 10/1990 |
| DE | 295 01 695 | 6/1995 |
| FR | 1 422 468 | 11/1965 |
| GB | 2 317 277 A | 3/1998 |

OTHER PUBLICATIONS

Derwent WPI English abstract of DE–U–87–02271 (= DE 38 04 549–A = DE 38 45 014–A), Schmider, publ. Jul. 16, 1987 & Aug. 25, 1988.

Derwent WPI English abstract of DE 295 01 695.7 (corresponding to EP 0 666 424–A1), publ. Aug. 9, 1995.

* cited by examiner

Primary Examiner—Khanh Dang
(74) Attorney, Agent, or Firm—Milton Oliver; Ware, Fressola Van Der Sluys & Adolphson LLP

(57) ABSTRACT

An electronically commutated direct-current motor has a permanent-magnet rotor (19), a stator (2) that has at least one drive winding (25), and an H-bridge circuit (52) in which two bridge elements are configured as transistors (54, 56) and the other two bridge elements as resistors (58, 60), the drive winding (25) being arranged on the diagonal of said H-bridge circuit (52); and it has a commutation circuit for alternate activation and deactivation of the two transistors (54, 56) of the H-bridge circuit (52). The motor operates quietly and with unusual reliability, and is well adapted for driving a fan.

19 Claims, 5 Drawing Sheets

ELECTRONICALLY COMMUTATED DC MOTOR

Cross-reference to related patent documents: German Utility Model DE-U1-295 01 695.7 and German Utility Model DE 8 702 271.

FIELD OF THE INVENTION

The invention relates generally to an electronically commutated direct-current motor (ECM) and, more particularly, to a motor which draws a relatively constant current.

BACKGROUND

Motors of this kind are used, for example, to drive fans (cf. German Utility Model DE-U1-295 01 695.7 filed Feb. 3, 1995 and published Jul. 20, 1995, assigned to Papst Motoren). In motors of this kind, the actual motor is often physically separated from its electronic components. A motor of this kind is nevertheless intended to start up reliably and above all to run quietly, i.e. with little noise.

SUMMARY OF THE INVENTION

One object of the invention is to make available a novel electronically commutated direct-current motor.

What is obtained by way of the invention is an ECM that is particularly suitable for driving fans, and that has particularly advantageous properties in combination with radial fans.

Further details and advantageous developments of the invention are evident from the exemplary embodiment—to be understood in no way as a limitation of the invention—described below and depicted in the drawings.

BRIEF FIGURE DESCRIPTION

DETAILED DESCRIPTION

Figure 1:
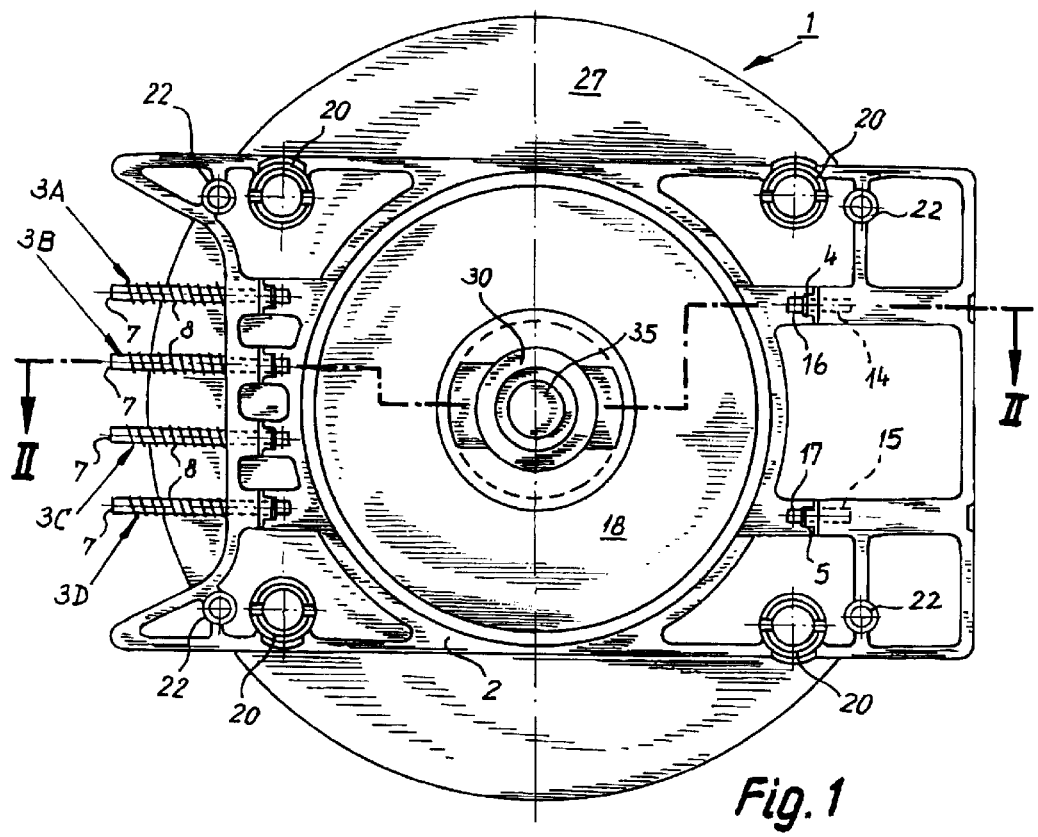
FIG. 1 is a bottom view of a radial fan that is driven by an electronically commutated motor.
Figure 2:
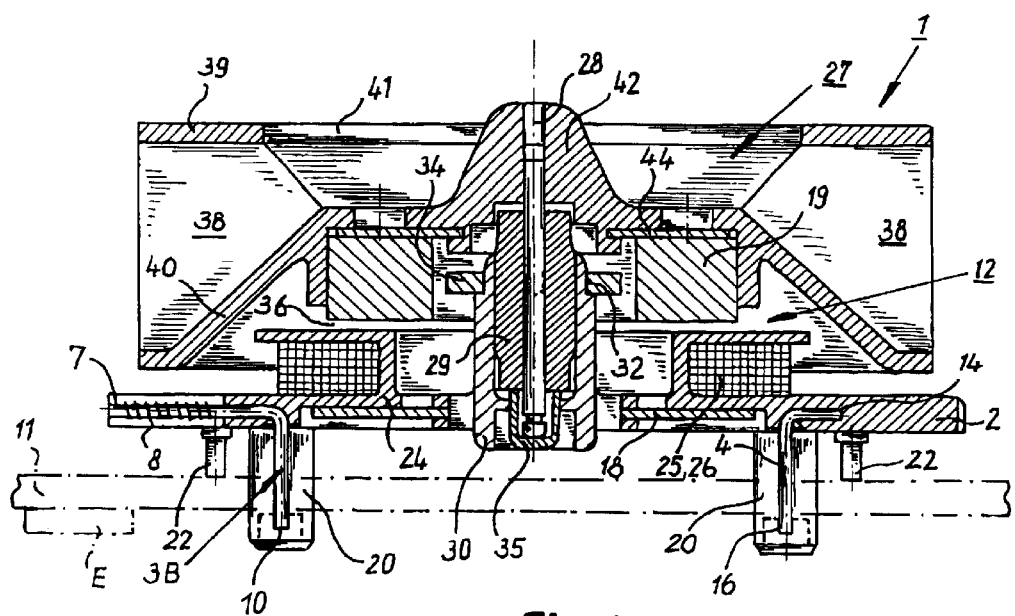
FIG. 2 is a section along line II—II of FIG. 1.

FIGS. 1 & 2 show, as a preferred embodiment, a radial fan 1 whose general structure is known from DE-U1-295 01 695.7. In FIG. 1, this fan 1 is depicted as seen from below, showing a support 2 that is configured as a plastic shaped part. Electrical terminals 3A, 3B, 3C, 3D, configured for example as terminal pins, and guide pins 4, 5 are arranged in shaped part 2 and secured there preferably by injection-molding. These molded-in or inserted terminal pins 3A, 3B, 3C, 3D are made of electrically conductive material. The one end 7 of pins 3A, 3B, 3C, 3D is respectively connected conductively to one end of winding terminals 8, and the other ends 10 of pins 3A, 3B, 3C, 3D project out of support 2 in the manner depicted. These ends 10 are inserted into openings or depressions, provided for the purpose, of a circuit board 11 (shown in FIG. 2 with dot-dash lines), and soldered there, i.e. connected in contacting fashion to electronic drive system E for motor 12 of fan 1. A preferred embodiment for such an electronic system E is described in detail with reference to FIGS. 3 and 4. Electronic system E is indicated symbolically in FIG. 2. It can be located anywhere on circuit board 11.

In its preferred form, motor 12 has a drive winding 25 and a sensor winding 26, whose terminals 8 are connected via terminal pins 3A, 3B, 3C, 3D to corresponding terminals on circuit board 11 and from there are supplied with power in accordance with the desired rotation speed and rotation direction. The terminals of drive winding 25 are labeled 3A and 3B, the terminals of sensor winding 26 3C and 3D.

Terminal pins 3A, 3B, 3C, 3D are of right-angled configuration, the one end 7 being arranged in the plane of the substantially flat support 2, and end 10 projecting downward out of support 2. Guide pins 4, 5 are also configured as right-angled pins made of an electrically conductive material; their one ends 14 and 15 lie in the plane of carrier 2, and their other ends 16 and 17 project out of support 2 substantially to the same length as and parallel to the other ends 10 of terminal pins 3A, 3B, 3C, 3D.

A magnetic return path element 18 for a rotor magnet 19, here a ferromagnetic sheet-metal disk in the form of a circular ring, is injection-molded into shaped part 2. Attachment means 20, for example formed as slit snap bolts, are injection-molded onto the underside of shaped part 2. The attachment means serve as assembly aids and for attaching fan 1 to circuit board 11. Spacer studs 22 are injection-molded onto the underside of shaped part 2. These serve to maintain a spacing between the underside of shaped part 2 and circuit board 11, and can also be used as gauge studs or guide studs.

The configuration described above of the stator, in particular of stator support 2, allows largely automated production; i.e. the winding and placement of winding ends 8 onto pins 3A, 3B, 3C, 3D, along with soldering and testing, can be accomplished on an automatic apparatus.

FIG. 2 shows details of FIG. 1 in section along line II—II of FIG. 1. The stator winding, which has drive winding 25 and sensor winding 26, is mounted on a coil body 24 (part of support 2).

A fan wheel 27 contains a shaft 28 that serves as the rotor shaft. It is mounted radially in a bearing arrangement 29 (sintered double bearing) which is mounted in a bearing support tube 30 that is part of the injection-molded shaped part 2. An upper rim 32 of bearing support tube 30 that is elongated in the axial direction and has a reduced outside diameter provides axial retention of the bearing in combination with a region of sintered bearing 29 having a reduced outside diameter. Sintered bearing 29 can also, alternatively, be attached by adhesive bonding, caulking, or the like. Mounted in the region of upper rim 32 is a magnetic auxiliary arrangement 34 (ferromagnetic or permanent-magnet arrangement) whose principal function is to bring rotor 19 into a desired staring position upon startup. To reduce costs, this auxiliary arrangement 34 can be formed as a disk that is punched out of magnetic rubber material.

A bearing shell 35 placed into bearing support tube 30 forms an axial bearing support for the lower end of shaft 28. The arrangement of bearing shell 35 determines the size of the substantially flat air gap 36 between rotor magnet 19 and stator winding 25, 26. Reference is made to German Utility Model DE 8 702 271 regarding the construction of the stator winding; for example, windings 25, 26 can be wound from two parallel wires, i.e. as a so-called bifilar winding.

Fan wheel 27 contains blades 38, extending substantially radially, which are arranged between a first guidance member 39 and a second guidance member 40. First guidance member 39 has a central air inlet opening 41 and is of substantially flat configuration. In this exemplary embodiment, the first and second air guidance members 39 and 40 form, viewed in axial cross section, an air outlet cross section that expands outward.

Located in the region of air inlet opening 41 is a segment 42 of the fan wheel in which shaft 28 is attached. A ferromagnetic return path disk 44, on which rotor magnet 19 for motorized drive of fan wheel 27 is arranged, is mounted in second air guidance member 40. Alternatively, an oriented-pole magnet without a return path disk can be used. As already described, electronic components E (transistors, resistors, etc.) for motor 12 are located on circuit board 11, and are connected via pins 3A, 3B, 3C, 3D to windings 25, 26 of motor 12. Components E are thus installed when circuit board 11 is populated. Fan 1 is also installed as a component on circuit board 11.

Components E are often installed by the customer on his or her circuit board 11, and the customer purchases a "naked" fan 1 and installs it on circuit board 11, so that an operable electronically commutated motor is created only by that installation. This kind of motor "manufacture" generally makes it impossible to use rotor position sensors, for example a Hall generator, which is otherwise often used in electronically commutated motors.

Figure 3:
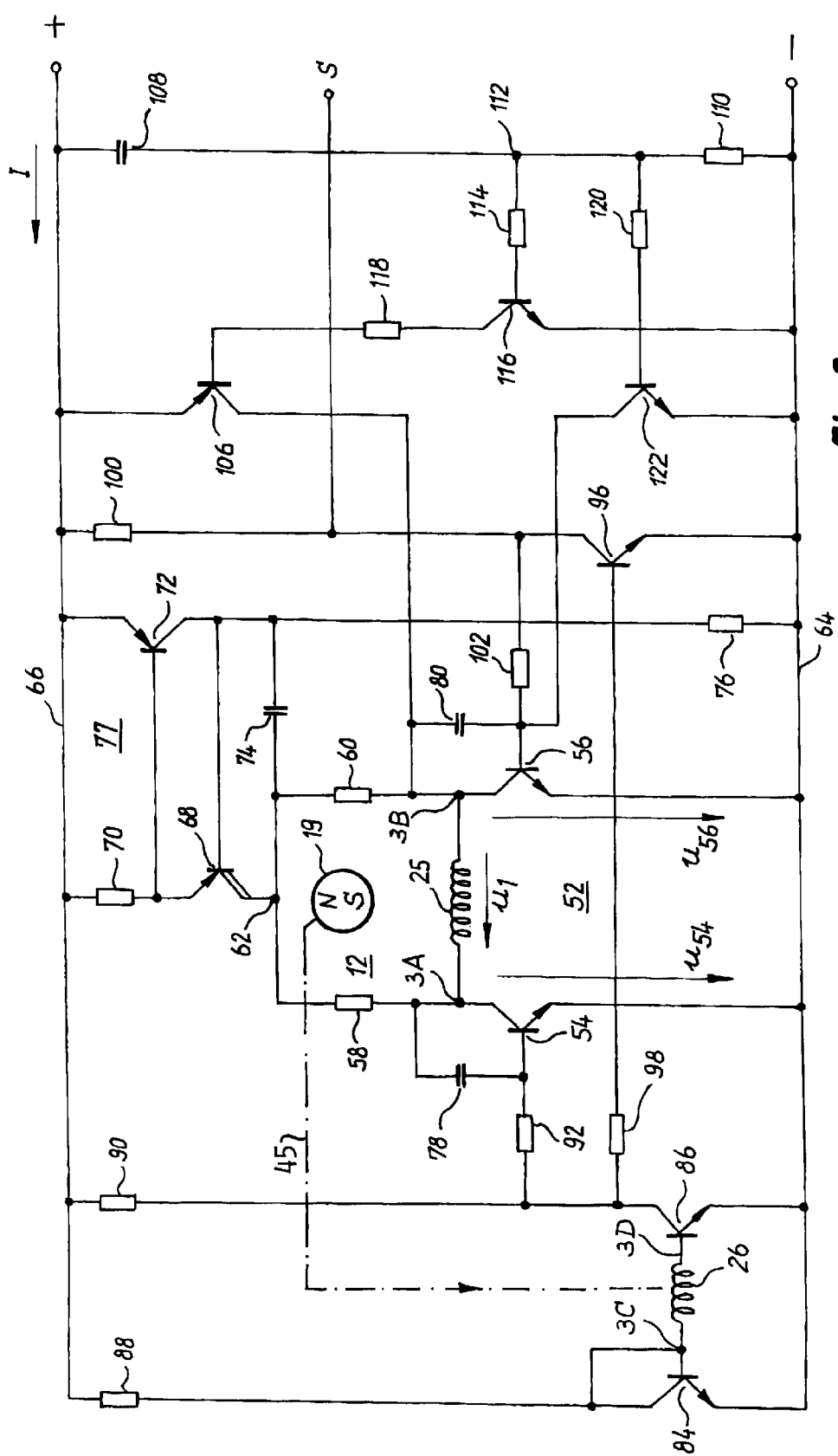
FIG. 3 shows a circuit according to the present invention that is suitable for operating the fan shown in FIGS. 1 and 2.
Figure 4:
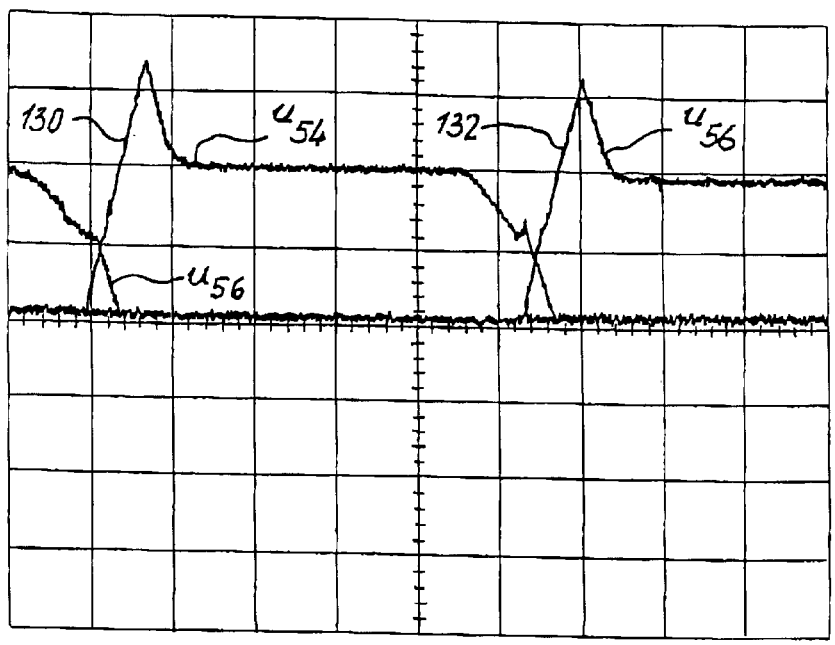
FIG. 4 shows the voltages that occur during operation between point 3A and negative line 64, and between point 3B and negative line 64, in FIG. 3.

In FIG. 3, drive coil 25 is arranged in an H-bridge 52. Rotor 19 is symbolically indicated. As it rotates, it induces a voltage in sensor winding 26, and this is symbolically indicated by a dot-dash line 45. When motor 12 is running, its commutation is controlled by the voltage induced in sensor winding 26. Bridge 52 has two npn transistors 54, 56 at the bottom, and two resistors 58, 60 at the top that are connected to a node 62.

The emitters of transistors 54 and 56 are connected to a negative line 64. A positive line is labeled 66. The collector of transistor 54 is connected to terminal 3A of coil 25, and the collector of transistor 56 to terminal 3B.

The collector of a pnp Darlington transistor 68, whose emitter is connected via a resistor 70 to positive line 66, is connected to node 62. The base of transistor 68 is connected to the collector of a pnp transistor 72 whose emitter is connected to positive line 66 and whose base is connected to the emitter of transistor 68. The collector of transistor 72 is connected via a capacitor 74 to node 62, and via a resistor 76 to negative line 64.

The two transistors 68, 72 with their resistors 70, 76 constitute a constant-current member 77 that delivers to H-bridge 52 a constant current which contributes to smooth operation of motor 12 and, in combination with a radial fan, results in particularly advantageous properties for such a fan, as will be explained below.

A Miller capacitor 78 is located between the collector and base of bridge transistor 54, and a Miller capacitor 80 analogously in the case of transistor 56. The purpose of these capacitors is to delay the activation and deactivation of transistors 54, 56, in order to reduce the noise of motor 12 to the greatest extent possible.

Sensor winding 26 is arranged between the bases of two substantially identical npn transistors 84 and 86, whose emitters are respectively connected to negative line 64 and whose collectors are connected, via resistors 88 and 90 respectively, to positive line 66. Its terminal 3C is connected to the base of transistor 84, and its terminal 3D to the base of transistor 86.

Transistor 84 is connected as a diode, i.e. its collector and its base are interconnected. Transistors 84 and 86 constitute a so-called "current mirror" circuit, i.e. a current that flows through transistor 84 results in a corresponding current in transistor 86, provided no voltage is induced in sensor coil 26. Resistor 90 is designed in such a way that the voltage at the collector of transistor 86, when the motor is switched on, is approximately 50% of the operating voltage between positive line 66 and negative line 64, so that transistor 54 of H-bridge 52 receives a base current via resistor 90 and its base resistor 92, and becomes conductive immediately after the motor is switched on. This ensures startup in the correct rotation direction from the starting position.

Figure 7:
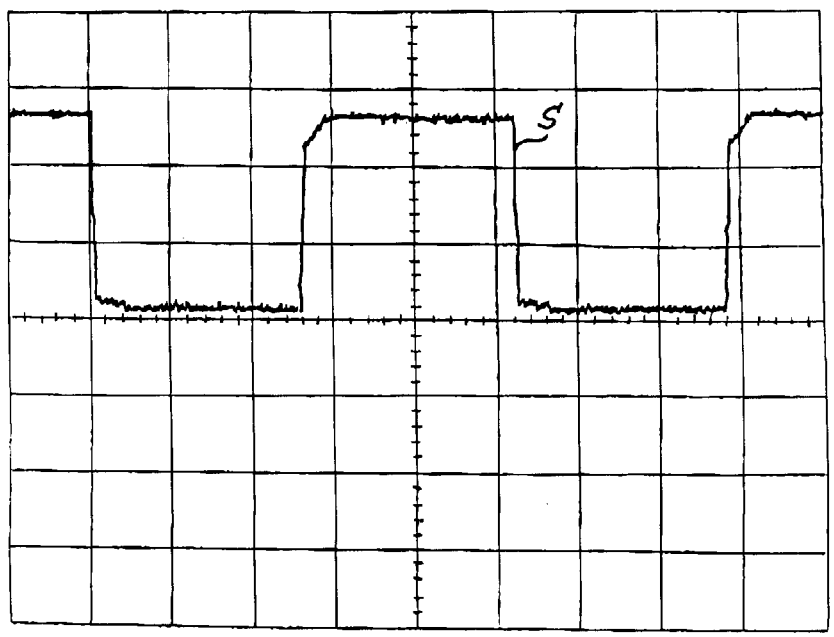
FIG. 7 shows the voltage at an output S of the circuit of FIG. 3 when the motor is rotating.
Figure 8:
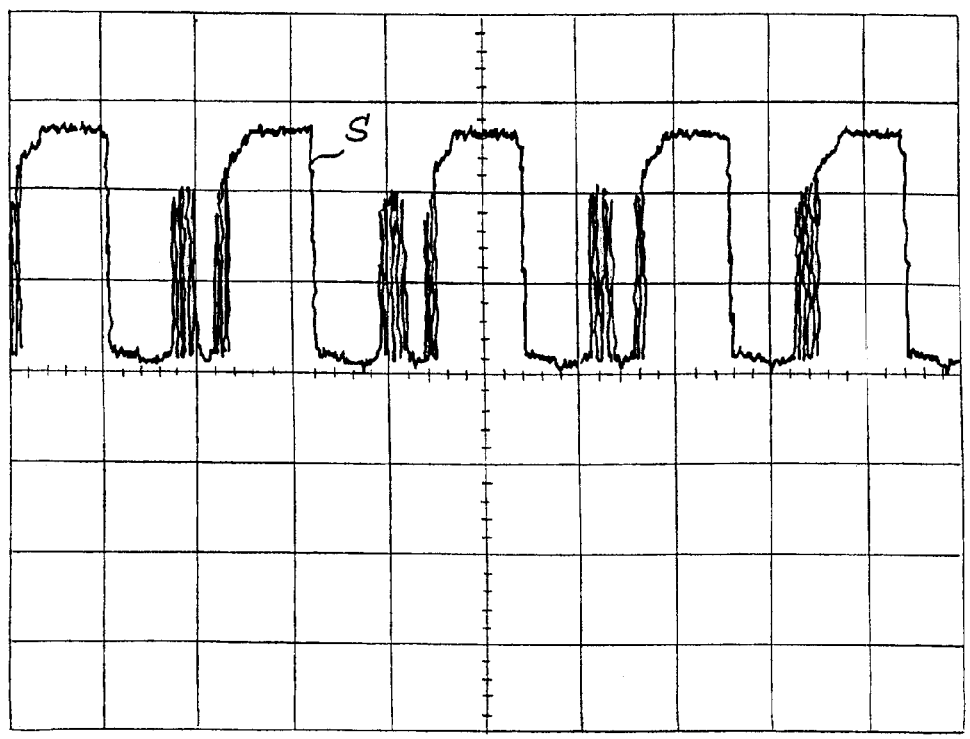
FIG. 8 shows the voltage at output S of FIG. 3 when rotor 19 is jammed or blocked from rotating.

Activation of the other bridge transistor 56 is provided by an npn transistor 96 whose base is connected via a resistor 98 to the collector of transistor 86, and whose collector is connected to a sensor output S, at which there occurs during operation a rotation-speed-dependent signal S that is depicted in FIG. 7 (signal when motor is rotating) and FIG. 8 (signal when motor is jammed). By way of signal S, it is possible to monitor whether motor 12 is rotating or is jammed.

The collector of transistor 96 is connected via a resistor 100 to positive line 66 and via a resistor 102 to the base of transistor 56 Directly after switching on, transistor 96 receives a base current via resistors 90 and 98 and thereby becomes conductive, so that bridge transistor 56 is inhibited.

Transistors of the same type, having operating values with only slight deviations from one another, should preferably be used in the current mirror circuit (transistors 84 and 86). This yields very reliable operation when the motor is switched on, i.e. reliable activation of bridge transistor 54 and inhibition of transistor 56.

When motor 12 is rotating and transistor 86 is caused, by the sensor voltage at sensor coil 26, to become fully conductive, transistors 54 and 96 receive no base current and are inhibited, so that transistor 56 becomes conductive.

When the rotor is rotating, transistor 86 is controlled by the sensor voltage induced by rotor magnet 19 (FIG. 1) as it rotates in sensor coil 26, so that as soon as rotor 19 rotates, transistors 54 and 56 are alternatingly activated and deactivated by the voltage at sensor coil 26.

When transistor 54; is conductive, a current flows through resistor 70, transistor 68, resistor 60, drive coil 25 (from 3B to 3A), and transistor 54 to negative line 64. When transistor 56 is conductive, a current flows through resistor 70, transistor 68, resistor 58, drive coil 25 (from 3A to 3B transistor 56 to negative line 64.

As a result, a current flows in alternating directions through drive coil 25. Since motors of this kind usually have a low power output, for example 0.4 to 0.7 W, the current that flows in this context through the other of the two resistors 58, 60 can be accepted; in other words, it reduces the efficiency, but can be tolerated because of the low power level of motor 12.

A pnp transistor 106 is connected parallel to resistor 60 and a constant-current element 77. Its collector is connected to terminal 3B of drive coil 25, and its emitter to positive line 66. When this transistor is conductive, a current thus flows directly from positive line 66 via transistor 106, drive coil 25, and transistor 54 (now conductive) to negative line 64, so as to create, when motor 12 is switched on, a high starting current pulse that imparts a vigorous rotation to rotor 19.

Transistor 106 is activated by way of an RC timing member having a capacitor 108 and a resistor 110. Capacitor 108 is connected to positive line 66 and connected via a node 112 to resistor 110, which in turn is connected to negative line 64. Connected to node 112 via a resistor 114 is the base of an npn transistor 116 whose emitter is connected to negative line 64, and whose collector is connected via a resistor 118 to the base of transistor 106.

Also connected to node 112 via a resistor 120 is the base of an npn transistor 122 whose emitter is connected to negative line 64, and whose collector is connected directly to the base of transistor 56.

When the motor is switched on, capacitor 108 is discharged, so that node 112 has approximately the potential of positive line 66. Transistors 116 and 122 thereby become conductive. Transistor 122 inhibits transistor 56. The effect of transistor 116 is that a base current flows to transistor 106 and makes that transistor conductive, so that as a result, as already described, a high current flows through drive coil 25 (from 3B to 3A) when motor 12 is switched on.

Capacitor 108 is quickly (e.g. within 0.1 second) charged via resistor 110, and transistors 106, 116, and 122 are thereafter inhibited as long as motor 12 is switched on.

Subsequent to the inhibition of these transistors and under the control of sensor coil 26, the two output-stage transistors 54 and 56 are alternatingly activated, as already described. This results in the voltage profile shown in FIG. 4, in which $u_{54}$ denotes the voltage between the collector of transistor 54 and negative line 64, and $u_{56}$ the voltage between the collector of transistor 56 and negative line 64.

The slope of edge 130 of $u_{54}$ is determined by capacitor 78 and resistor 92. The slope of edge 132 of voltage $u_{56}$ is determined by capacitor 80 and resistor 102 The edge slope should not be too steep, in order to keep the noise of motor 12 as low as possible.

Figure 5:
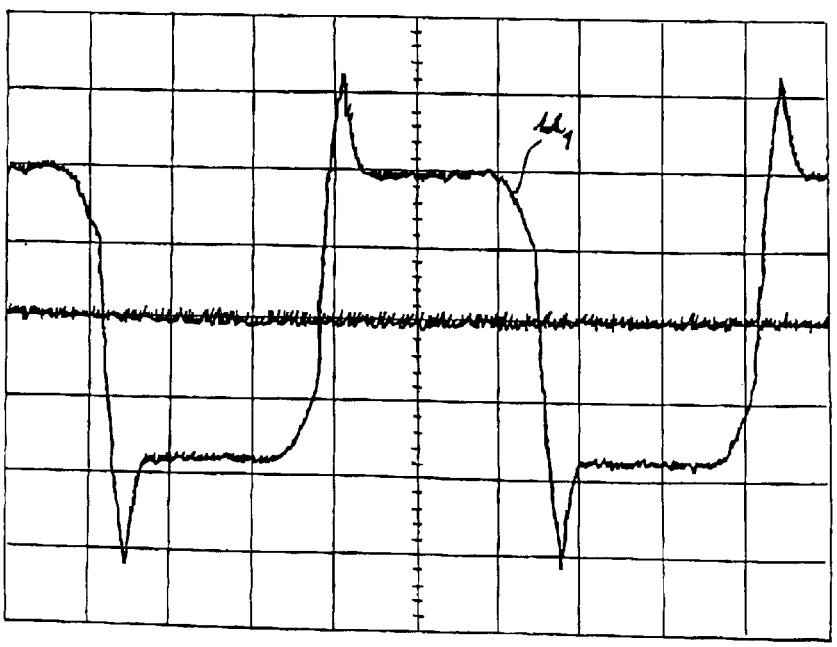
FIG. 5 is a graph of a voltage that occurs during operation at drive coil 25 of FIG. 3, i.e. between 3A & 3B.

FIG. 5 shows the voltage $u_1$ at drive coil 25. This voltage has a symmetrical profile, which contributes substantially to quiet motor operation.

Figure 6:
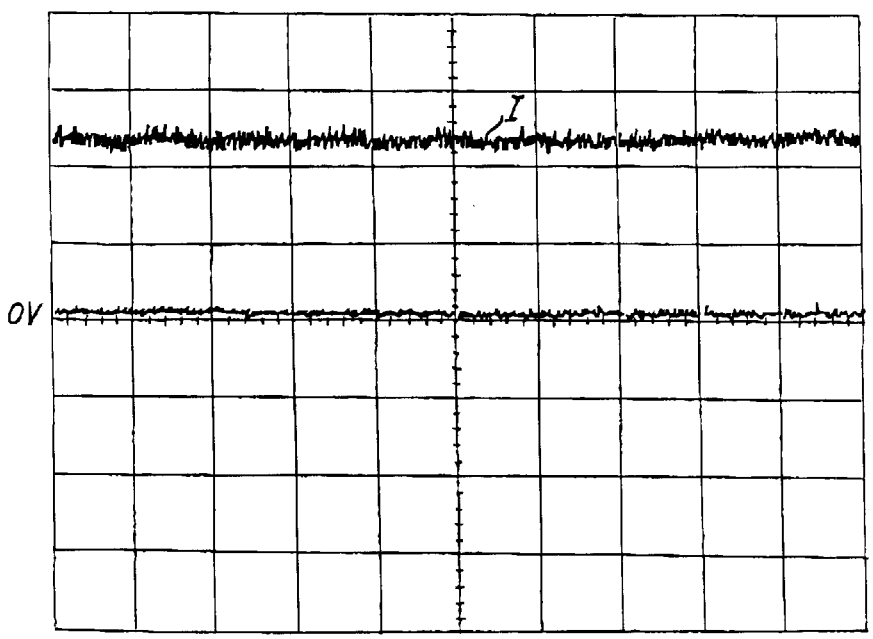
FIG. 6 shows the total current I.

FIG. 6 shows the total current I (cf. FIG. 3) through motor 12. This current is, for example, 40 mA (within an operating voltage range of 9 to 16 V), and it is evident that this current is very constant; this is achieved using constant-current element 77. Another way to state this is that after it starts up, ECM 12 continuously operates with current limiting, i.e. the ECM would actually like to receive a higher current, but the latter is held by the constant-current element to a largely constant value, e.g. to 40 mA.

This is particularly advantageous in conjunction with a radial fan, since the result is a fan with outstanding characteristics. For example, if an air filter in the air path of this fan is partially clogged, a radial fan of this kind whose ECM 12 is operated with constant current automatically increases its rotation speed, so that air is delivered through such a filter, even when such would no longer be the case with an equivalent axial fan.

In addition, if the filter is not clogged, a largely constant rotation speed is obtained over the entire voltage range between 9 and 16 V, for example a rotation speed of approximately 2700 rpm; and that rotation speed is practically unaffected by fluctuations in the operating voltage.

FIG. 7 shows voltage S during operation of motor 12. This is a square-wave voltage whose frequency is twice the rotation speed, e.g. a frequency of 120 Hz at 60 rpm.

FIG. 8 shows voltage S in the event of a jammed rotor 19. In this case, S has either a frequency of zero or, as depicted, a high frequency due to internal oscillations, so that an alarm signal can be generated by way of a connected alarm circuit (not depicted).

By changing resistor 70 it is possible to adjust the constant current through constant-current element 77, and thus the rotation speed of motor 12.

Typical component values are indicated below for a motor 12 with an operating voltage between 9 and 16 V and an operating current of approximately 40 mA at 2700 rpm:

| | |
|---|---|
| Resistors 90, 98, 100, 118 | 10 kΩ |
| Resistors 92, 102 | 0.43 kΩ |
| Resistors 58, 60 | 0.36 kΩ, 250 mW |
| Resistor 88 | 33 kΩ |
| Resistor 70 | 16 Ω |
| Resistor 76 | 4.7 kΩ |
| Resistors 110, 114, 120 | 1 MΩ |
| Capacitors 78, 80 | 330 nF |
| Capacitor 108 | 100 nF |
| Capacitor 74 | 10 nF |
| Transistors 54, 56, 84, 86, 96, 116, 122 | BC847C |
| Transistors 72, 106 | BC857B |
| Transistor 68 | BST60 |

Many variants and modifications are of course possible in the context of the present invention. Therefore, the invention is not limited to the particular embodiments shown and described, but rather is defined by the following claims.

What is claimed is:

1. An electronically commutated direct-current motor comprising a first lead for connection to one of the polarities of a direct current source, and a second lead for connection to the other of said polarities, further comprising:

a permanent magnet rotor;

a stator associated with said rotor and comprising at least one drive winding having two terminals;

a commutation circuit comprising an H-bridge circuit having bridge elements for controlling current flow in said at least one drive winding, two of said bridge elements being configured as transistors, one transistor being arranged in a current path from said one winding terminal and one of said leads, the other transistor being arranged in a current path from said other winding terminal and said one of said leads, each transistor serving for controlling the connection between an associated one of said winding terminals and one of said leads, said transistors being adapted to be activated and deactivated, in alternation, by said commutation circuit;

and two others of said bridge elements being configured as resistors, one resistor being arranged in a current path from said one winding terminal to the other one of said leads, and the other resistor being arranged in a current path from the other winding terminal to the other one of said leads.

2. The motor according to claim 1, further comprising a constant-current element (77) connected in series with the H-bridge circuit (52).

3. The motor according to claim 1, further comprising, on the stator (2), at least one ferromagnetic part (34) that, when the motor is in a zero-current state, pulls the rotor (19) into a predefined starting position.

4. The motor according to claim 1, further comprising, on the stator (2), at least one ferromagnetic part (34) that, when the motor is in a zero-current state, pulls the rotor (19) into one of a plurality of predefined starting positions.

5. The motor according to claim 3, wherein the at least one ferromagnetic part is configured as a permanent magnet (34).

6. The motor according to claim 1, wherein the commutation circuit is configured in such a way that after starting up, a predefined transistor (54) of the H-bridge circuit (52) is activated and the other transistor (56) is inhibited.

7. The motor according to claim 1, further comprising
a sensor winding (26), arranged on said stator (2) such that the permanent-magnet rotor (19) induces a sensor voltage in said sensor winding as the rotor rotates; and in which said commutation circuit includes a current mirroring circuit (84, 86) with which the sensor winding (26) is electrically connected in such a way that, in the absence of a sensor voltage at the sensor winding (26), the current mirroring circuit (84, 86) brings about a predefined switching state of the H-bridge circuit (52).

8. The motor according to claim 7, wherein the current mirroring circuit comprises two transistors (84, 86) between whose bases the sensor winding (26) is arranged, one of the transistors (84) being connected as a diode and the other transistor (86) serving to control the H-bridge circuit (52).

9. The motor according to claim 8, wherein
the other transistor (86) of the current mirroring circuit is connected in series with a collector resistor (90), and
the current mirroring circuit is designed in such a way that, when the motor is stationary, the potential, between the other transistor (86) and its collector resistor (90), is on the order of half the operating voltage of said motor.

10. The motor according to claim 1, further comprising
a semiconductor bypass switch (106) which, when the motor (12) is switched on, is briefly caused to be conductive and thereby bypasses an element (60), configured as a resistor, of the H-bridge circuit (52), in order to raise a starting current of the motor.

11. The motor according to claim 2, further comprising
a semiconductor bypass switch (106) which, when the motor is switched on, is briefly caused to be conductive, to thereby bypass said constant-current element and an element, configured as a resistor, of said H-bridge circuit, in order to enable a higher starting current as the motor starts up.

12. The motor according to claim 10, wherein the semiconductor bypass switch (106) has, associated therewith, a timer which causes said semiconductor bypass switch to be conductive only for a predefined time period after the motor is switched on.

13. The motor according to claim 12 wherein, during the predefined time period, that bridge element of the H-bridge circuit which is configured as a transistor, and is connected in series with the semiconductor bypass switch, is blocked.

14. The motor according to claim 13, which is configured for directly driving a fan wheel.

15. The motor according to claim 14, wherein the fan wheel is coupled to a permanent magnet forming a part of the rotor of the motor.

16. The motor according to claim 4, wherein the at least one ferromagnetic part is configured as a permanent magnet (34).

17. A method of operating an electronically commutated dc motor, said motor having a stator comprising a drive winding connected to a driver circuit,
said stator being coupled with the stationary part of a radial fan comprising a rotatable radial fan component;
said motor further comprising a permanent magnet rotor interacting with said stator and being directly coupled with said rotatable radial fan component;
comprising the step of
operating the electronically commutated direct current motor by applying thereto, in operation, a constant current adapted to a desired rotation speed range of the radial fan.

18. An electronically commutated direct-current motor for a driving a radial fan arrangement having a fan wheel, said motor comprising
a permanent-magnet rotor (19) configured as a constituent of the fan wheel of the radial fan arrangement;
a stator comprising at least one drive winding;
a current limiting arrangement which is continually active when the motor is in operation, to substantially maintain a drive current flowing through the motor at a predefined value; and
a deactivation apparatus for the current limiting arrangement, for automatically deactivating the latter for a predefined time period after the motor is switched on.

19. The motor according to claim 18, further comprising a timer (108, 110) for controlling the predefined time period.

* * * * *

UNITED STATES PATENT AND TRADEMARK OFFICE
CERTIFICATE OF CORRECTION

PATENT NO.     : 6,456,024 B1
DATED          : September 24, 2002
INVENTOR(S)    : Schmider et al.

It is certified that error appears in the above-identified patent and that said Letters Patent is hereby corrected as shown below:

Column 2,
Line 61, "staring" should be -- starting --.

Column 4,
Line 30, after "56" -- . -- should be inserted.
Line 53, after "3B" -- ), and -- should be inserted.

Column 5,
Line 36, after "102" -- . -- should be inserted.

Signed and Sealed this

Fifth Day of August, 2003

JAMES E. ROGAN
*Director of the United States Patent and Trademark Office*